United States Patent [19]

Hermens

[11] Patent Number: 4,549,108

[45] Date of Patent: Oct. 22, 1985

[54] MULTICHANNEL X-RAY DETECTOR WITH MULTIPLE ELECTRICAL FEEDTHROUGH MEMBERS

[75] Inventor: Joannes L. G. Hermens, Eindhoven, Netherlands

[73] Assignee: U.S. Philips Corporation, New York, N.Y.

[21] Appl. No.: 497,464

[22] Filed: May 23, 1983

[30] Foreign Application Priority Data

Jun. 4, 1982 [NL] Netherlands ........................ 8202258

[51] Int. Cl.$^4$ ................................................ G01T 1/18

[52] U.S. Cl. ...................................... 313/93; 313/331; 250/385

[58] Field of Search ........................... 313/93, 51, 331; 250/385 (U.S. only)

[56] References Cited

U.S. PATENT DOCUMENTS

| | | | |
|---|---|---|---|
| Re. 30,644 | 6/1981 | Whetten et al. | 250/385 |
| 3,764,730 | 10/1973 | Malone et al. | 174/151 |
| 4,161,655 | 7/1979 | Cotic et al. | 250/385 |
| 4,297,576 | 10/1981 | Laval et al. | 250/385 X |
| 4,306,155 | 12/1981 | Cotic | 313/93 X |

*Primary Examiner*—Palmer C. DeMeo
*Attorney, Agent, or Firm*—Paul R. Miller

[57] ABSTRACT

In devices having several electrical connections passing through a separation wall, feedthrough is realized by means of a flexible printed tape. The printed tape includes a number of electrical conductors, and is enveloped by a polyimide carrier which constitutes with an epoxy glue a very reliable permanent seal in separation walls of both metal and ceramic materials.

4 Claims, 2 Drawing Figures

MULTICHANNEL X-RAY DETECTOR WITH MULTIPLE ELECTRICAL FEEDTHROUGH MEMBERS

The invention relates to a gas-filled multichannel X-ray detector comprising a plurality electricaly conducting lead-through members electrically insulated for each other and passed through a separation wall.

BACKGROUND OF THE INVENTION

In such a device in the form of a gas-filled multidetector, each of the signal electrodes is connected to a separate electrically insulated feedthrough passing through a chamber wall of the detector. On the outer side of the detector, signal lead-out conductors are also connected to the feedthroughs. In practical cases it has been found that, especially if, as in the present case, many feedthroughs are required, irregularities, such as gas leakage, electrical leakage and shortcircuits and the like, often occur. These irregularities are of more frequent occurrence as a feedthrough is used more actively. This may be due both to mechanical and to thermal causes. Corresponding problems occur in devices in which several electrical conductors have to be passed through a vacuum wall. This is the case, for example, in cathode-ray tubes having several electrodes to which electrical potentials are applied or from which electrical signals are derived or to which these signals are supplied.

SUMMARY OF THE INVENTION

The invention has for its object to obviate these disadvantages and a device of the kind mentioned in the preamble is therefore characterized in that the electrical conductors form part of a flexible printed tape having a multi-layer structure, an insulating envelope of which is sealed to the separation wall.

Due to the fact that in a device according to the invention the feedthrough passing through the separation wall is realized by means of a flexible printed tape, further contacts can be arranged at an arbitrary distance from the separation wall, which is already a first cause for reduction of disturbances. Moreover, it has been found that a connection between the separation wall and the printed tape, which, for example, is in the form of a glue compound with epoxy glue, yields a permanent very reliable seal. A direct consequence of the assembly of the electrical conductors in a printed tape is that electrical disturbances are substantially excluded with the use of a feedthrough according to the invention. A great advantage is that for the feedthrough no special limitations need be imposed on the choice of the material for the separation wall and that besides metal and glass, for example, also ceramic material and synthetic material may be used.

In a preferred embodiment according to the invention, the printed tape comprises polyimide as the electrically insulating carrier material. The polyimide mostly also constitutes an electrically insulting envelope of the printed tape. The envelope may further accommodate a field-screening metal layer or metal guaze. Such a printed tape may comprise a large number, for example, thirty-two separate electrical conductors and for this purpose often is constructed as a multibearing.

In a further embodiment, the printed tape partly has a flexible and partly has a non-flexible character, for example, due to the fact that an additional hard layer is locally applied by means of known techniques. Thus, for example, a part at the area and in the proximity of the feedthrough may have a non-flexible character, just like parts to which connector sockets for further connections are secured. The flexible character of the printed tape as a whole is thus not lost.

BRIEF DESCRIPTION OF THE DRAWINGS

A few embodiments according to the invention will now be described more fully with reference to the drawing. In the drawing.

DESCRIPTION OF THE PREFERRED EMBODIMENTS

Figure 1:
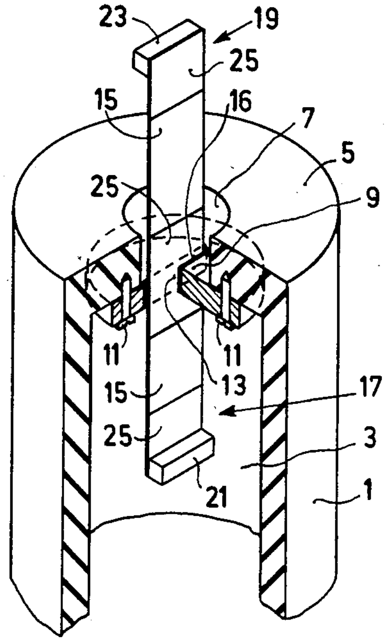
FIG. 1 shows a vessel with a feedthrough according to the invention.

A feedthrough according to the invention of the kind shown in FIG. 1 comprises a vessel 1 by which a conditioned space 3, containing for example a given gas composition, a vacuum, or a liquid, is sealed from the surroundings. A cover part 5 of the vessel is provided with an opening 7, which in FIG. 1 has a circular form, but which may also take the adapted form of a slot. In the opening 7 is mounted a sealing member 9 which is connected, for example, by means of screws 11 to the cover 5. The sealing member 9 is preferably mounted on that side of the wall on which the pressure is highest because an additional pressure is than exerted. Through a passage 13 in the sealing member 9, the feedthrough is realized by means of a flexible printed tape 15. The printed tape is then connected preferably by means of a suitable glue compound 16 to the sealing member 9 or in the case of a slot-shaped opening also directly to the cover. Electrical conductors in the printed tape (not shown separately) are enclosed by an insulating layer, preferably of polyimide. This material is very flexible, has a high resistance to corrosion and can be glued satisfactorily with, for example, a cold hardening epoxy glue. In the given embodiment, connector sockets 21 and 23 are provided at the ends 17 and 19 of the printed tape. These sockets may be arranged at a distance from the feedthrough adapted to the conditions. For the description of the flexible printed tape reference is made to "Solid State Technology", November 1971, pp. 27–32 or to "Electronic Engineering", October 1969, pp. 29–31. Especially for connections to be provided on the outer side of a vessel, a larger mounting distance is a great advantage because the feedthrough for the connections itself need now no longer be touched and lengthening wires need not be used. For example, parts 25 of the printed tape may be constructed, if desired, as a non-flexible tape.

Figure 2:
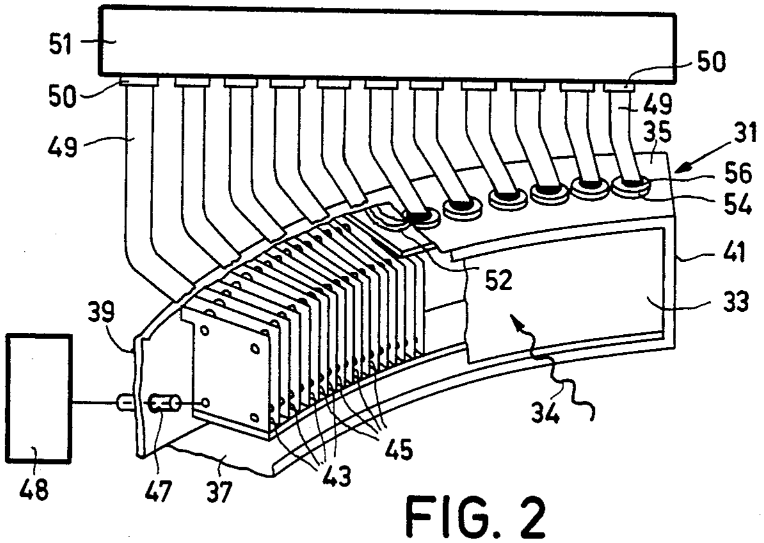
FIG. 2 shows a multichannel X-ray detector with a series of such feedthroughs.

For a multichannel X-ray detector, FIG. 2 shows a housing 31 with a radiation entrance window 33 for admitting X-ray radiation 34, an upper wall 35, a lower wall 37, a rear wall 39, and a side wall 41. In the housing are alternately disposed a number of signal electrodes 43 and a number of high-voltage electrodes 45. The high-voltage electrodes 45 may be interconnected and may be connected together to a feedthrough 47. A voltage source 48 can then be connected externally to the feedthrough 47. The signal electrodes 43 have to be each individually readable and leads will therefore have to be passed individually through a housing wall. For this purpose, feedthroughs according to the invention are particularly suitable. For this purpose, a number of printed tapes 49 each, for example, comprising thirty-two electrical conductors, establish connections between the electrodes 43 and a signal reading device 51; and for each printed tape, thirty-two signal electrodes can be connected. This connection can be established by means of connector sockets 50 corresponding to the sockets 21 and 23 shown in FIG. 1.

A higher degree of flexibility for this connection is obtained if for this purpose the printed tape is provided at an end located in the detector with a bundle of connection wires 52 with the use of interconnection conductors again being avoided. The printed tape may for this purpose also be provided with connection tongues adapted to further connections and to this end the tape is mostly widened in situ. For example, contact pins of the signal electrodes may then be directly connected to the tongues, as a result of which the risk of disturbances is still further reduced. The widened portion of the printed tape can be preferably folded so that it can be passed through the slots in the cover. The printed tape can be provided with connector sockets, with a bundle of wire conductors, and with direct connection tongues by means of standard techniques. A detector of the kind described herein comprises, for example, 576 signal electrodes having a feedthrough realized with the aid of only eighteen standard printed tapes with each having thirty-two electrical conductors. Electrical disturbances from outside the printed tape can be avoided by surrounding the conductors by an electrically conductive screening, which for example, is in turn surrounded by a screening layer of polyimide. The feedthroughs are realized in this case by means of covers 54 which are provided with a slot, through which the printed tape is passes with a glue plug 56.

Although the device according to the invention has been described above mainly with reference to an X-ray detector, its field of use is much wider. The invention may also be used successfully for feedthroughs for products having an evacuated space in which, for example, electrodes are disposed. It applies, for example, to cathode-ray tubes in the widest sense. In this case, a printed tape can then replace a number of pin-shaped feedthroughs. A very advantageous use is that for photomultiplier tubes, especially in view of the large number of electrodes (dynodes) and the small space for feedthroughs, and often also for further connections.

Further uses are found, for example, for image intensifier tubes, for electron-optical apparatus, for liquid-filled apparatus having several electrical lead-in and lead-out conductors, for equipment that has to operate in aggressive surroundings, and the line.

What is claimed is:

1. In a gas-filled multi-channel X-ray detector comprising a housing having at least one wall, a plurality of electrodes in said housing, a plurality of feedthrough members passed through said wall, said feedthrough members being electrically insulated from one another, the improvement comprising each of said feedthrough members including a flexible printed tape member, said tape member forming in part a plurality of electric conductors to said electrodes, and said tape member having an insulating envelope sealing said tape member to said wall, wherein said insulating envelope includes a cover in said wall with a slotted opening through which said tape member passes, and a glue plug for sealing said opening.

2. A detector according to claim 1, wherein said insulating envelope is polyimide.

3. A detector according to claim 1, wherein said glue plug is a cold hardening glue compound.

4. A detector according to claim 1, wherein said tape member provides a bundle of electrical connection wires within said detector, and wherein a separate one of said connection wires of said bundle are connected to each of said electrodes.

* * * * *